INVENTORS.
OSWALD JOSEF ROSANOWSKI
& HORST HANIGCK

ATTORNEY

Oct. 26, 1965  O. J. ROSANOWSKI ETAL  3,213,969
SPOT-TYPE DISC BRAKE
Filed Feb. 12, 1963  7 Sheets-Sheet 2

INVENTORS
OSWALD JOSEF ROSANOWSKI &
HORST HANIGCK

BY Gordon C. Mack
ATTORNEY

Oct. 26, 1965   O. J. ROSANOWSKI ETAL   3,213,969
SPOT-TYPE DISC BRAKE

Filed Feb. 12, 1963   7 Sheets-Sheet 4

INVENTORS.
OSWALD JOSEF ROSANOWSKI &
HORST HANIGCK
BY
*Jordon C. Mack*
ATTORNEY

Oct. 26, 1965    O. J. ROSANOWSKI ETAL    3,213,969
SPOT-TYPE DISC BRAKE
Filed Feb. 12, 1963    7 Sheets-Sheet 5

INVENTORS.
OSWALD JOSEF ROSANOWSKI &
HORST HANIGCK
BY
ATTORNEY

Oct. 26, 1965   O. J. ROSANOWSKI ETAL   3,213,969
SPOT-TYPE DISC BRAKE
Filed Feb. 12, 1963   7 Sheets-Sheet 6
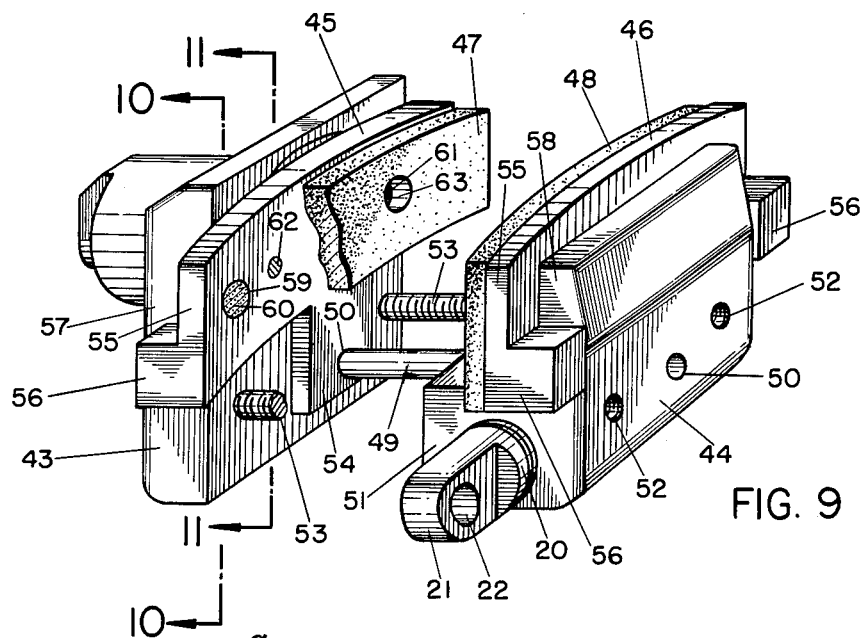
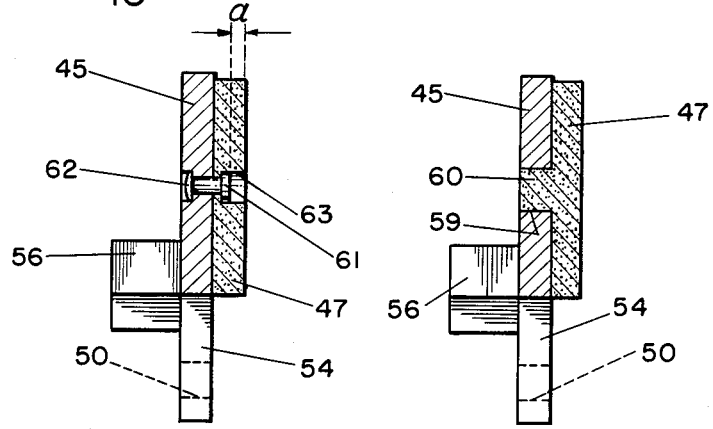
INVENTORS.
OSWALD JOSEF ROSANOWSKI &
HORST HANIGCK
BY
ATTORNEY Oct. 26, 1965  O. J. ROSANOWSKI ETAL  3,213,969
SPOT-TYPE DISC BRAKE
Filed Feb. 12, 1963  7 Sheets-Sheet 7

INVENTORS.
OSWALD JOSEF ROSANOWSKI &
HORST HANIGCK
BY
ATTORNEY

United States Patent Office 3,213,969
Patented Oct. 26, 1965

3,213,969
SPOT-TYPE DISC BRAKE
Oswald Josef Rosanowski, Lindau-Rehlings (Bodensee), and Horst Hanigck, Lindau (Bodensee), Germany, assignors to Allbau Entwicklungs G.m.b.H. u. Co., Lindau (Bodensee), Germany, a firm of Germany
Filed Feb. 12, 1963, Ser. No. 257,951
Claims priority, application Germany, Oct. 19, 1962,
R 33,716
8 Claims. (Cl. 188—73)

This invention relates to brakes of the disc type wherein a plurality of braking surfaces engage the rotating disc on opposite sides thereof. Brakes of the general type herein disclosed have been used in conjunction with heavy vehicles where increased braking power is mandatory.

A known brake design utilizes a plate disc extending radially outwardly from the rotating shaft with primary and secondary brake pads mounted on a common support which extends around the outer periphery of the disc. In this type of brake design the mounting of the brake pads has become extremely critical; thus, it is necessary to insure that the pads are properly aligned with the rotating disc so as to engage the disc over its full periphery and thereby obtain good wear characteristics. Also, it is necessary to insure that the pads are freely movable into engagement with the disc and will not bind and cause a complete failure of the brake.

Another problem has been the necessity for periodically adjusting the position of the brake pads to compensate for wear. A further problem resides in dissipating the heat generated by application of the brakes. With the known designs, the heat is transferred directly inwardly to the rotating shaft thus requiring elaborate cooling apparatus to protect the bearings and other parts of the mechanism.

It is an object of this invention to provide a disc brake that is self-adjusting and self-aligning.

It is a further object of this invention to provide improved cooling characteristics in a disc brake.

It is a still further object to provide a disc brake that is light in weight and cheap to manufacture.

It is another object to provide a disc brake that includes improved braking torque characteristics.

It is a more specific object of this invention to provide a device wherein the brake pad carrier plates are adjustable in a direction parallel to the rotating axis of the disc.

It is a more specific object of this invention to provide a brake disc wherein the operating mechanism automatically compensates for the wear on the brake pad.

More specifically, the objects and purposes of this invention are embodied in a brake wherein there is a rotating disc and a brake unit mounted on a stationary support. As distinguished from known brake designs, the disc in the instant invention is a ring-like member mounted at its outer periphery on a hub member. The brake unit includes brake lining pads disposed on opposite sides of the rotating disc with each pad carried by backing plates movable relative to each other into engagement with the disc. Each of the backing plates is supported by backing plate mounts with both the backing plate and the mounts being slidably mounted on a pin carried by the stationary support. The mounting structure for the pads and backing plates is adjacent the inner periphery of the ring disc as opposed to the prior art wherein the brake unit covers the outer periphery of the disc. A hydraulic actuator is secured to one of the backing plate mounts and includes a piston directly operable to cause one of the backing plates to move to a position where its associated pad engages the disc. Further actuation of the actuator causes the entire brake unit, including the other backing plate, to move in a direction opposite to and relative to the first backing plate, thereby fully engaging the brake.

The supporting pins for the braking unit include a swivel arrangement whereby the braking unit is pivotable relative to the axis of the rotating disc, thus allowing the brake to compensate in alignment relative to the disc.

As to the actuator for actuating the braking unit, means are provided in the cylinder whereby the return travel of the hydraulic piston is automatically varied as the brake linings decrease in thickness due to the normal wear.

Other objects and aspects of the invention will become more apparent upon a complete perusal of the specification.

In the drawings:

FIG. 9 is a partially exploded perspective view of the second embodiment showing the relationship of the braking elements;

FIG. 10 is a view taken along line 10—10 of FIG. 9;

FIG. 11 is a view taken along line 11—11 of FIG. 9;

Figure 1:
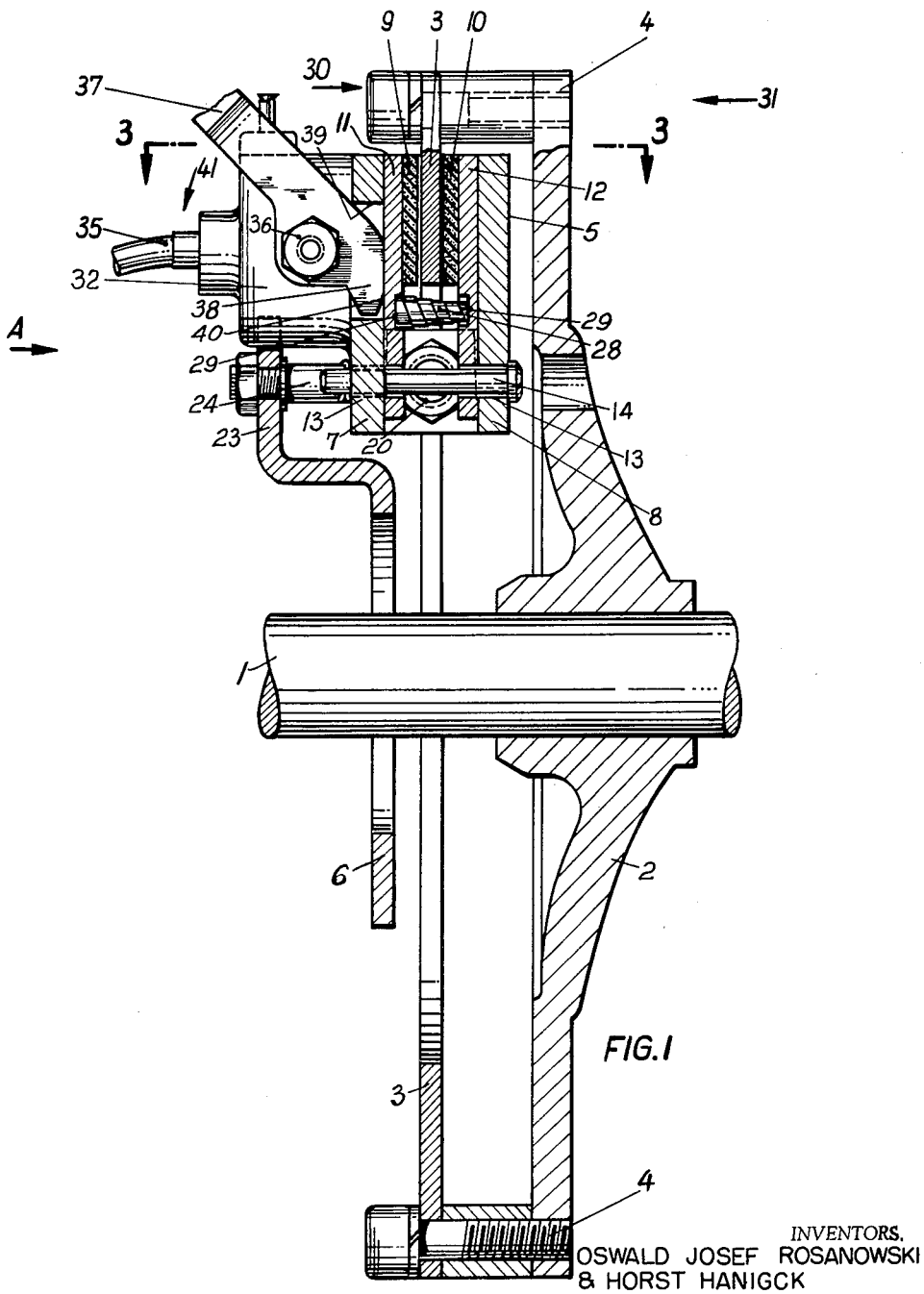
FIG. 1 is a section view on the line 1—1 of FIG. 3 showing one embodiment of the invention when the brake is disengaged.

Referring to the drawings, FIG. 1 illustrates one preferred embodiment of my invention. A rotatable shaft 1 has secured thereto a hub 2. At the outer periphery of the hub 2 a ring disc 3 is secured by bolts 4 with spacers on the bolts 4 positioning the disc axially away from the hub 2. A brake unit generally indicated at 5 is secured to a stationary support 6. Brake unit 5 consists of mounting plates 7 and 8 with each of the mounting plates carrying friction pads 9 and 10 mounted on backing plates 11 and 12 respectively. The mounting plates 7 and 8 as well as the backing plates 11 and 12 have holes 13 in them through which a carrier bolt 14 is slidably received.

Figure 4:
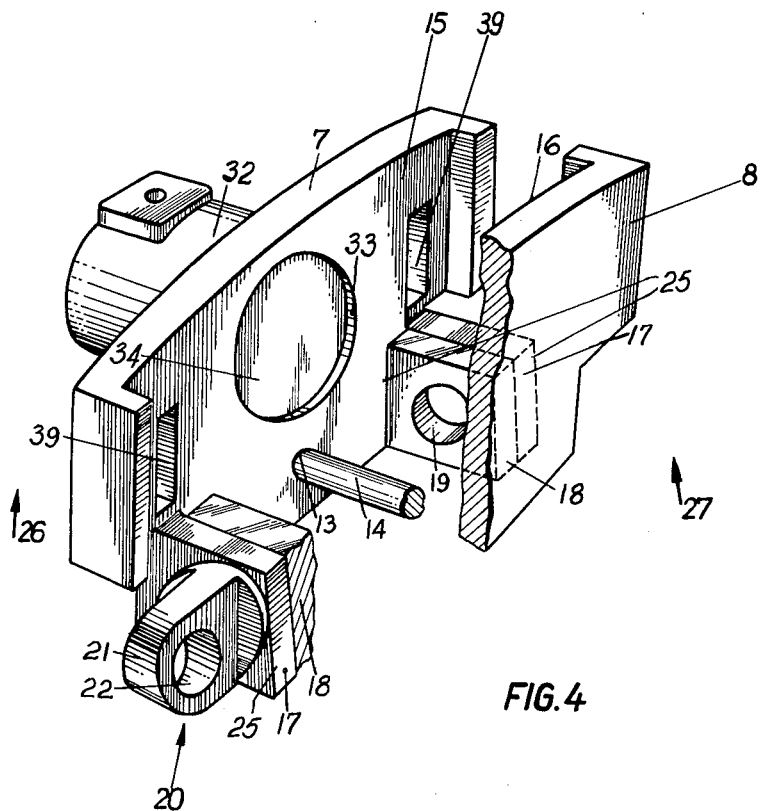
FIG. 4 is a partially exposed perspective view of some of the elements of the embodiment shown in FIG. 1.
Figure 5:
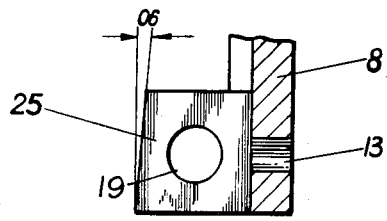
FIG. 5 is a broken away elevation view of one of the elements in FIG. 4.

As best shown in FIGS. 4 and 5, each of the mounting plates 7 and 8 has on its surfaces 15 and 16, respectively, lugs 17 and 18, respectively. Each of these lugs 17 and 18 has a bore 19 whose axis is parallel to the plane of the ring disk 3. As shown in FIG. 4, the arrangement of the lugs 17 and 18 on the plates 7 and 8 is such that the bores 19 are in alignment when the brake unit is in the assembled position. Passing through these aligned bores are bolts 20. Each of the heads 21 of the bolts 20 has a bore 22 which slidably receives a bolt 24. Bolts 24 in turn are secured to the upper portion 23 of the stationary support 6 and serve as the mounting means for the brake unit 5. It should be noted, however, that the bolts 20 are rotatably received in the bores 19 thus allowing the mounting plates 7 and 8 to rotate about the bolts 20, thus affording a swivel connection relative to the stationary support 6.

Referring to FIG. 5, each of the lugs 17 and 18 on the front surface 25 thereof is bevelled at an angle approximately of 1° in relation to the vertical. By means of this inclined surface 25, the plates 7 and 8 may pivot toward each other around the bolts 20 in the direction of the arrows 26, 27 in FIG. 4. Thus, it may be seen that the bolts 20 allow the entire brake unit 5 to swivel relative thereto, and the inclined surfaces at 25 enable the mounting plates 7 and 8 to be tilted inward toward each other by an amount limited by the loose fit of bolt 14. Such an arrangement, practically eliminates any danger of the binding together of the individual parts of the brake unit and also makes possible extraordinarily uniform bearing surfaces on both sides of the brake disc 3, and thereby assures the proper wear characteristics of the brake pads.

To assure that the mounting plates 7 and 8 do not inadvertently tilt inward toward each other and thereby inadvertently brake the rotating disc, a coil spring 28 is disposed in recesses 29 on the inner side of each of the backing plates 11 and 12, thereby tending to separate the disc plates and assure disengagement of the brake.

Figure 2:
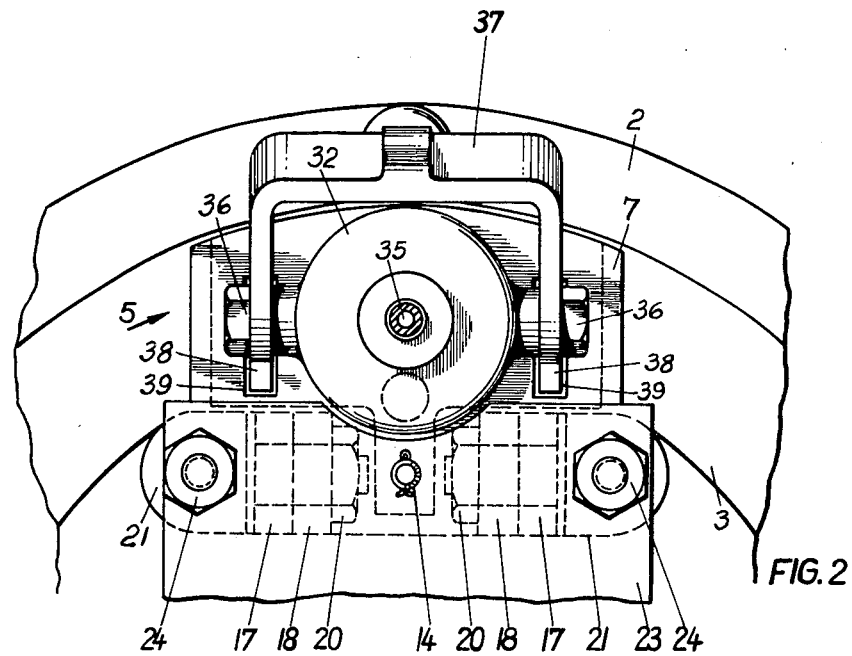
FIG. 2 is an end elevation view of the brake unit shown in FIG. 1.
Figure 3:
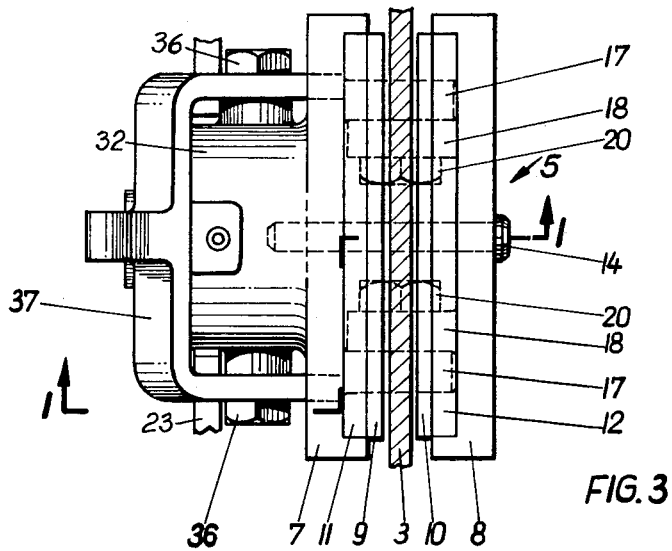
FIG. 3 is a view taken at line 3—3 of FIG. 1.

As an actuator for the brake unit, a fluid pressure cylinder 32 is secured to the mounting plate 7. As shown in FIG. 4, a cylindrical opening 33 is formed in the plate 7 through which a piston 34 is adapted to pass and abut backing plate 11. An alternative actuator is provided as shown in FIGS. 1 and 2 in the form of a U-shaped fork 37 secured by bolts 36 to the outer wall of the pressure cylinder 32. The two ends 38 of the fork 37 are adapted to pass through openings 39 in plate 7 and abut the backing plate 11 at 40.

In operation, assuming utilization of the fluid pressure actuator, hydraulic fluid is introduced through conduit 35 causing the piston 34 to pass through the opening 33 in the mounting plate 7 and abut backing plate 11. Further fluid pressure causes the piston 34 to move the plate 11 and its attendant friction pad 9 in the direction of the arrow 30, FIG. 1, until the pad 9 has fractionally engaged the surface of the ring disc 3. Further pressure exerted by the fluid actuator is ineffective to move the piston 34 and backing plate 11 any further in the direction of the arrow 30, FIG. 1, until the pad 9 has frictionally engaged mounting plate 7, and the mounting plate 8 all move in the direction of the arrow 31 causing the friction facing 10 to engage the ring disc 3. In this manner, both the horizontal mutual shifting of the individual parts of the brake unit and the shifting of the brake unit itself is accomplished on the carrier bolt 14 as well as on both bolts 24. Inasmuch as ample play has been provided for this support, as already stated above, it is practically impossible for the individual parts of this brake to bind. Also, it is possible for mounting plates 7 and 8 themselves during the braking action to effect a swivelling motion relative to each other, and this again will assist in the proper frictional contact of the brake pads 9 and 10 against the ring disc 3.

Upon release of the hydraulic fluid pressure, the spring 28 will cause the plates 11 and 12 to separate and thereby return the parts to their initial resting position.

If, on the other hand, instead of the hydraulic actuator the U-shaped fork 37 is manually operated, the arms 38 take over the function of the piston 34 and press at 40 the friction facing 9 against the ring disc 3 while the balance of the procedure remains the same as described above.

Aside from the self-aligning nature of the disclosed brake, several additional features should be noted. By using an annular disc instead of mounting the disc directly on the hub in the form of a plate, improved cooling is obtained. Just as the ring disc 3 is only indirectly connected through bolt 4 and hub 2 to the shaft 1, so also any heat generated by the braking action must travel the same tortuous route before reaching any critical shaft bearings. Obviously, considerable dissipation of the heat occurs by virtue of this arrangement.

Another point, directly related to the cooling feature, should be emphasized. The utilization of a ring disc permits the support structure for the brake pads and backing plates to be located inside of the disc. For a given space, this arrangement allows utilization of a disc having a greater diameter than was possible with the prior art. Thus, the disc in the instant arrangement may extend to the extreme outer periphery of the encasing structure whereas the diameter of the plate disc of the prior art is limited by the brake pad mounting structure being positioned between the casing and the outer periphery of the disc. With a disc of greater diameter, it is possible to have the brake pads engage the disc at a greater radial distance from the shaft and thereby to require a lower braking effort for a given level of torque. Obviously the heat generated is related to the braking force required so that a lower level of braking effort will produce less heat which in turn will lower the cooling requirements. It also should be noted that a decrease in generated heat will have a considerable effect on increasing the life of the brake pads.

Figure 6:
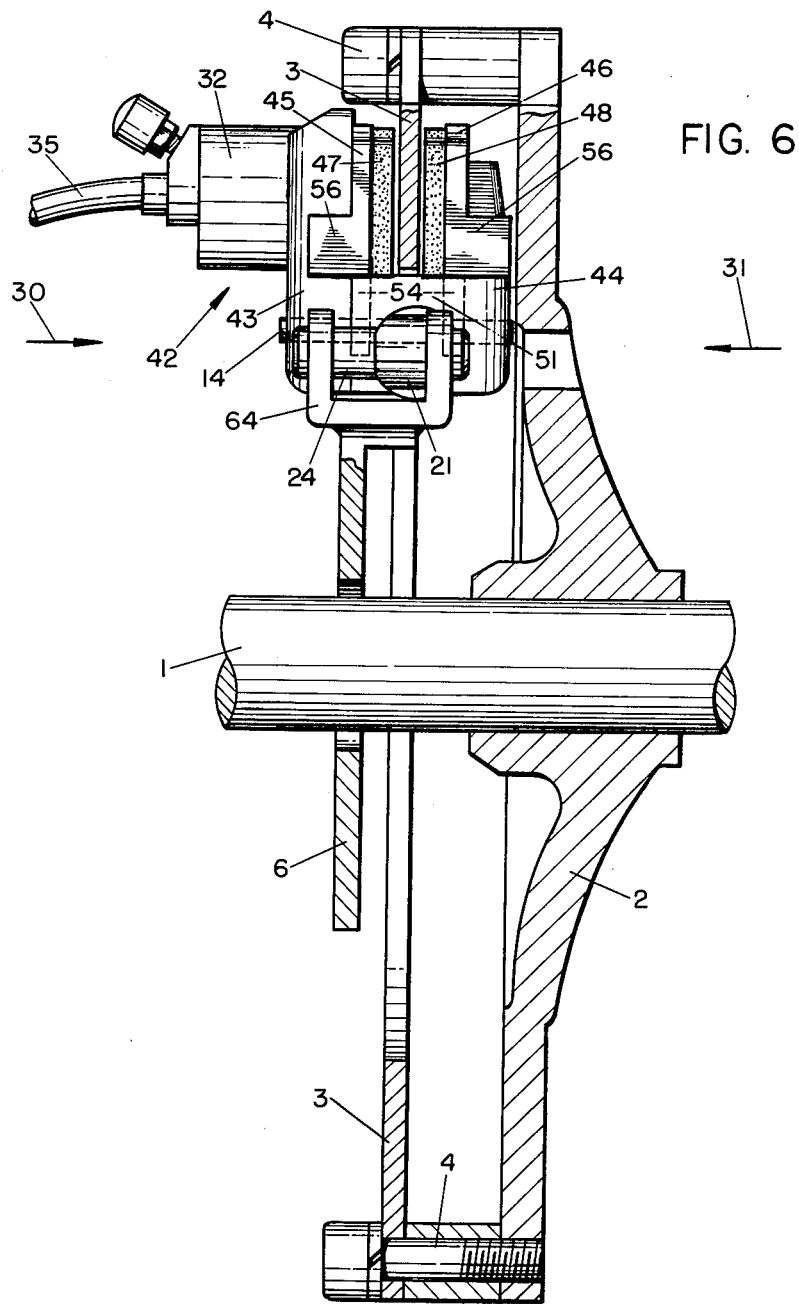
FIG. 6 is a view similar to FIG. 1, illustrating a second embodiment of the invention.

Turning to the second embodiment of the invention illustrated in FIG. 6, wherein like parts are identified by like reference numerals, the rotatable shaft, hub and ring disc are the same as those shown in FIG. 1 with the stationary support 6 supporting a modified brake unit 42. The modified unit 42 consists of mounting supports 43 and 44 (FIG. 6). Received on these mounting supports are T-shaped backing plates 45 and 46 which mount friction pads 47 and 48. A carrier bolt 49 is slidingly received in holes 50 passing through the mounting supports and the backing plates.

The mounting support 44 has formed at its opposite lower edge portions projecting lugs 51 which extend inwardly toward the opposing mounting support 43. As illustrated, particularly in FIGS. 7 and 9, two threaded bolts 53 are received in threaded bores 52 thereby to rigidly secure the supports 43 and 44 together.

Since the carrier bolt 49 is freely received in bores 50 formed in the lower portions 54 of the backing plates, it is necessary that the plates 45 and 46 be further restrained from rotative movement. To accomplish this, projecting lugs 56 are formed on the outer edges 55 of each of the plates 45 and 46 and are in loose sliding engagement with the corresponding outer surfaces 57 and 58 of the mounting supports 43 and 44.

The brake pads 47 and 48 are secured to the backing plates 45 and 46 in a manner to insure the absence of any relative movement. Thus, each of the pads includes an integral plug 60 which is received in holes 59 in the plates. Also holes 63 are provided in the pads for the purpose of accommodating the head 61 of rivet 62 with the depth "a" (FIG. 11) of the hole representing the maximum permissible wear of the pads.

Figure 7:
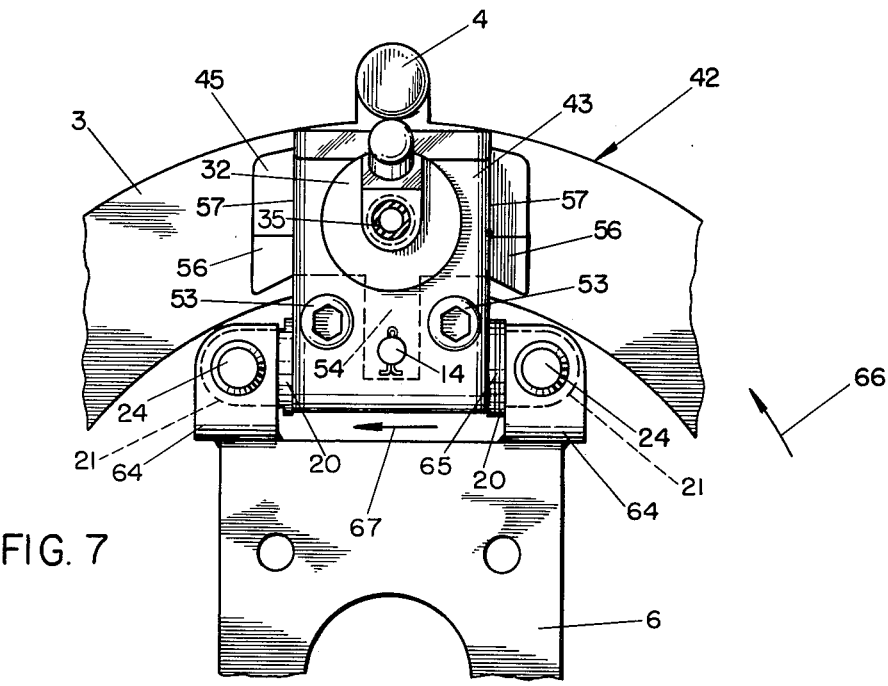
FIG. 7 is an end elevation view of the second embodiment shown in FIG. 6.
Figure 8:
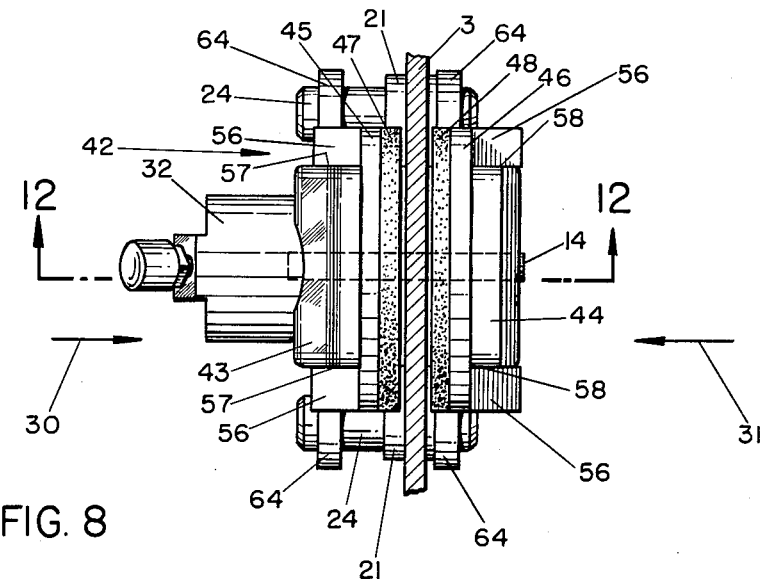
FIG. 8 is a plan view of the second embodiment of the invention showing the brake disengaged.

The brake unit 42 is mounted on the stationary support in a manner similar to that illustrated in FIG. 1. However, only mounting support 44 has lugs 51 which project toward the other of the supports. Since the supports are secured together by bolts 53, there is no possibility of relative swiveling movement; and it is unnecessary for the other support 43 to have a corresponding lug. As illustrated in FIGS. 7 and 9 swivel bolts 20, identical to those of the first embodiment are rotatably received in bores formed in lugs 51. Received in the hole 22 in the head 21 of the swivel bolts are supporting bolts 24 which in turn are carried on a bracket 64 secured to the stationary member 6.

Referring to FIG. 7, a spring ring or washer 65 is received on one of the swivel bolts 20. The location of the washer 65 is dependent upon the direction of rotation of the ring disc 3 since it is desirable to eliminate any axial shifting of the brake unit 42 longitudinally of the swivel bolts. As shown in FIG. 7, during the braking process, the ring disc 3 which is rotating in the direction of the arrow 66 is inclined to shift the brake unit 42 to the left (arrow 67) along the bolts 20. This tendency causes undesirable noise and rattle as well as consequent wear of the relatively shifting parts. By utilization of the washer 65 the brake unit is retained in a shifted position and thereby eliminates such noise and wear.

Figure 12:
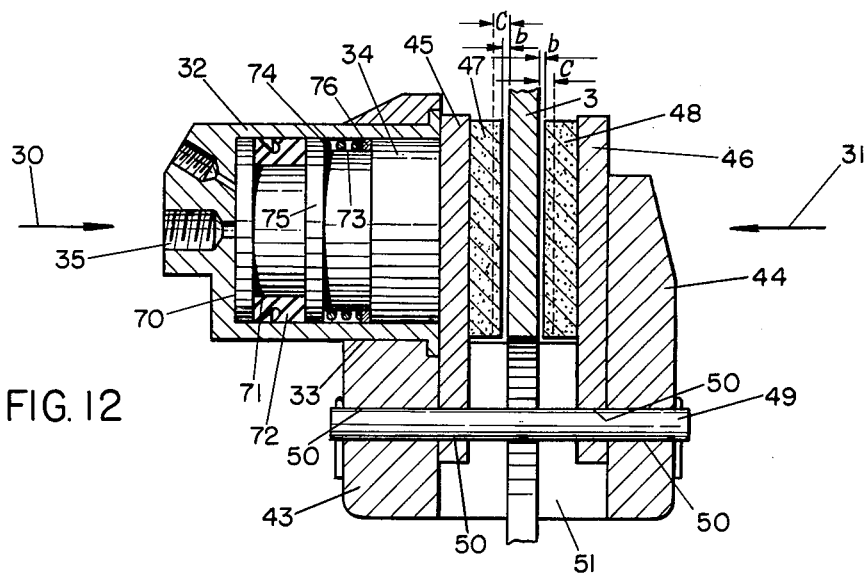
FIG. 12 is a view taken on line 12—12 of FIG. 8.
Figure 13:
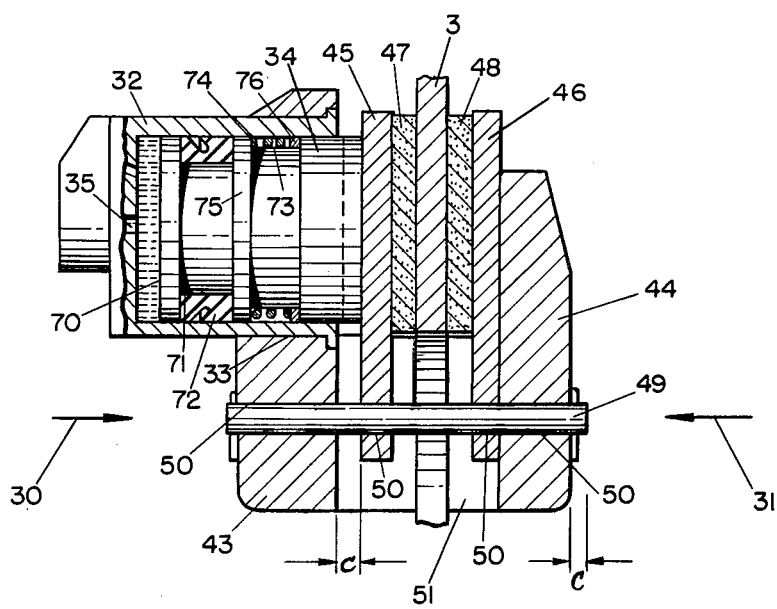
FIG. 13 is a view similar to FIG. 12, showing the brake engaged.

The fluid actuator of the second embodiment is identical to that illustrated in the embodiment of FIG. 1 and operates in a manner similar thereto in actuating the brake mechanism. Referring more specifically to FIGS. 12 and 13 wherein the fluid actuator is illustrated, it may be seen that the actuator comprises a fluid chamber in which is slidably received the piston 34. In the area of the piston 34 adjoining the rear surface 70 thereof a groove 71 is provided. Disposed in the groove 71 is an oil pressure sealing gasket 72. Adjacent to the groove 71 but longitudinally spaced therefrom is a second groove 73. Disposed in the groove 73 is a coil spring 74 having one end abutting piston collar 75 and the other end abutting a retaining ring 76. The retaining ring 76 is a press-fit within the cylinder bore and acts as a retainer abutment for the spring 74 regardless of the position of the piston 34.

The dimensions of the spring 74 are designed in such a manner that the difference between the normal length of the spring and its solid height is in the order of 2.0 mm. This design of the spring, together with the retaining ring 76 functions not only as a means for disengaging the brake, but also as an automatic wear compensator in the following manner. If fluid is introduced through the conduit 35, thus introducing fluid pressure into the chamber against the surface 70 of the piston 34, the piston 34 will be moved in a direction to compress the spring 74. The piston 34 will project outwardly of the chamber and abut the backing plate 45. As shown in FIG. 12, the friction facing 47 is normally spaced by a distance $b$ from the ring disc 3 wherein the distance $b$ equals approximately 0.5 mm. Thus, movement of the piston and the backing plate through 0.5 mm. of travel will cause frictional engagement of the friction surface 47 with the ring disc 3. Additional fluid pressure on the piston 34, since the piston 34 cannot execute any further sliding advance, has as a consequence that the hydraulic unit 32, mounts 43 and 44 and backing plate 46 will move in a direction opposite to the initial movement of the piston 34 and backing plate 45 and thereby cause frictional engagement of the friction surface 48 with the ring disc 3. Due to the swivel bolts, the entire brake unit 42 is free to adjust itself to the position of the ring disc 3 and thus assure full frictional engagement of the linings 47 and 48 with the ring disc 3. Upon exhaust of the hydraulic pressure from the chamber, the piston 34 will be returned to its resting position shown in FIG. 12 by virtue of the spring 74 reacting between the collar 75 and the retaining ring 76.

As the brake linings become worn and the distance between the linings and the ring disc 3 has been increased, by, for example, an amount of 1.00 mm. each, the total distance to be traversed by the brake linings in engaging the ring disc is now $c$ equal to 1.50 mm. as shown in FIG. 12. Thus, the piston 34 in order to engage both of the linings 47 and 48 must execute a total stroke of 3.0 mm. relative to the cylinder housing 32. However, the spring 74 is capable of being compressed only to the extent of its total axial play of 2.00 mm. The result is that the retaining ring 76 is moved forward relative to the cylinder housing 32 a distance of 1.0 mm. during the outward stroke of the piston. Upon exhaust of the hydraulic pressure, the spring will expand causing the piston to be retracted. However, the retaining ring 76 is now securely frictionally gripped in a new forward position relative to its normal position so that the piston 34 will no longer be retracted fully within the chamber, but rather will protrude by about 1.0 mm., as shown by the dotted line in FIG. 13. This combined action of the spring 74 and retainer ring 76 accomplishes the result that the piston 34, wholly independently of the wearing out process of the brake linings 47 and 48, will always be moved 2.0 mm. back to its rest position after each braking operation, thus assuring that the total play between the ring disc and the brake linings can at no time be greater than 2.0 mm. while the retaining ring 76 will be promptly moved forward if at any time the total play existing between the disc and the linings is increased by even the smallest amount beyond 2.0 mm.

It is believed obvious that the value of 2.0 mm. is purely illustrative and that any value may be selected dependent upon the maximum amount of piston stroke per brake engagement that is desired.

Although the present invention has been described in connection with a few preferred embodiments thereof, variations and modifications may be resorted to by those skilled in the art without departing from the principles of the invention. All of these variations and modifications are considered to be within the true scope and spirit of the present invention, as disclosed in the foregoing description and defined by the appended claims.

We claim:
1. In a disc brake, the combination comprising,
   a rotatable disc,
   a stationary member,
   first and second mounting supports,
   said supports being spaced apart with said disc being interposed therebetween,
   a friction plate slidably carried by each of said supports and adapted to engage said disc,
   means mounting said supports and plates for swivelling movement in a direction transverse to the plane of said disc comprising swivel bolts rotatably received at either end of one of said supports,
   said swivel bolts being slidably received on said stationary member,
   said swivel mounting means further comprising lug means projecting from the ends of each of the supports toward the other of the supports.
   the lugs at respective ends of said supports having aligned holes therethrough with said swivel bolts being rotatably received therein, and
   actuating means carried by one of said mounting supports and adapted to directly engage the friction plate associated with said one of said mounting supports whereby actuation of said actuating means causes said latter-mentioned friction plate to be displaced relative to its associated mounting support into engagement with said disc and upon further actuation of said actuator means to cause displacement of the other of the friction plates and the mounting supports in a direction opposite to the direction of movement of the former friction plate.

2. The brake of claim 1, wherein said actuating means comprises a fluid chamber,
   a piston reciprocably received in said chamber,
   a bore passing through the actuating means support and in alignment with said chamber whereby said piston means project therethrough,
   a collar on said piston,
   a retaining ring frictionally engaged in said chamber, and
   a spring interposed between said collar and said ring and being operative to retract said piston within said chamber,
   said retaining ring acting as a stop for said piston in the direction of bias of said spring,
   the difference between the normal length and solid height of said spring being of a value such that the retaining ring is moved along the chamber as the friction plates become worn.

3. The brake of claim 1, wherein each of said lug means includes an inclined surface adapted to allow relative swivelling movement of the mounting supports.

4. In a disk brake, the combination comprising a rotatable disk,
   a stationary member,
   a braking unit comprising primary and secondary braking elements disposed on opposite sides of said disk, means supporting said braking unit on said stationary member for slidable and swivelling movement relative thereto, said last mentioned means comprising swivel bolts rotatably received in and projecting from either end of said brake unit with the longitudinal axis of said bolts being parallel to the plane of said rotatable disk, the projecting ends of each of said bolts having a bore therethrough with the bores extending transversely of the longitudinal axis of said bolts, support rods mounted on said stationary member and slidably received in the bores of said swivel bolts, and an actuator means operable to cause progressive engagement of said primary element and said secondary element.

5. The brake of claim 4, wherein said supporting means includes projecting lugs on one of said braking elements, said swivel bolts being received in bores formed in said lugs.

6. The brake of claim 4, wherein said actuator means comprises a hydraulic cylinder, a piston reciprocable in said cylinder, and means in said cylinder operatively associated with said piston to adjustably limit the return stroke of said piston.

7. In a disc brake, the combination comprising, a rotatable disc, a stationary member, first and second mounting supports, said supports being spaced apart with said disc being interposed therebetween, a friction plate slidably carried by each of said supports and adapted to engage said disc, means mounting said supports and plates for swivelling movement in a direction transverse to the plane of said disc comprising swivel bolts rotatably received at either end of at least one of said supports, said swivel bolts being slidably received on said stationary member, said mounting means further permitting pivotal movement of each of said supports relative to each other, and actuating means carried by one of said mounting supports and adapted to directly engage the friction plate associated with said one of said mounting supports whereby actuation of said actuating means causes said latter-mentioned friction plate to be displaced relative to its associated mounting support into engagement with said disc and upon further actuation of said actuating means to cause displacement of the other of the friction plates and the mounting supports in a direction opposite to the direction of movement of the former friction plate.

8. In a disc brake, the combination comprising, a rotatable disc, a stationary member, first and second mounting supports, said supports being spaced apart with said disc being interposed therebetween, a friction plate carried by each of said supports and adapted to engage said disc, means mounting said supports and plates for swivelling movement in a direction transverse to the plane of said disc, said mounting means further permitting pivotal movement of each of said supports relative to each other, and actuating means carried by one of said mounting supports and adapted to directly engage the friction plate associated with said one of said mounting supports whereby actuation of said actuating means causes said latter-mentioned friction plate to be displaced relative to its associated mounting support into engagement with said disc and upon further actuation of said actuating means to cause displacement of the other of the friction plates and the mounting supports in a direction opposite to the direction of movement of the former friction plate.

References Cited by the Examiner

UNITED STATES PATENTS

| 2,419,113 | 4/47 | Bricker | 188—73 X |
| 2,655,229 | 10/53 | Eksergian | 188—73 X |
| 2,835,350 | 5/58 | Butler | 188—73 |
| 2,888,109 | 5/59 | Tankersley | 188—196 |
| 2,921,651 | 1/60 | Myers | 188—73 |
| 2,924,302 | 2/60 | Black | 188—73 |
| 2,949,173 | 8/60 | Peras | 188—196 |
| 2,966,964 | 1/61 | Brueder | 188—152 X |

FOREIGN PATENTS

| 461,453 | 1/51 | Italy. |
| 1,267,299 | 6/61 | France. |

MILTON BUCHLER, Primary Examiner.

EUGENE G. BOTZ, ARTHUR L. LA POINT,

Examiners.